United States Patent
Hunt

(10) Patent No.: US 9,720,935 B2
(45) Date of Patent: Aug. 1, 2017

(54) SUGGESTING INFORMATION TO BE ASSOCIATED WITH IMAGES BASED ON METADATA EMBEDDED IN IMAGES

(75) Inventor: Peter William Hunt, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 13/482,261

(22) Filed: May 29, 2012

(65) Prior Publication Data
US 2013/0325896 A1    Dec. 5, 2013

(51) Int. Cl.
G06F 17/30 (2006.01)
G06F 15/16 (2006.01)
G06Q 10/00 (2012.01)

(52) U.S. Cl.
CPC ....... G06F 17/30268 (2013.01); G06Q 10/00 (2013.01)

(58) Field of Classification Search
CPC ......... G06F 17/30041; G06F 17/30047; G06F 17/30268
USPC .................................................. 707/776, 918
See application file for complete search history.

(56) References Cited

U.S. PATENT DOCUMENTS

| | | | |
|---|---|---|---|
| 7,774,003 B1* | 8/2010 | Ortega et al. | 455/456.2 |
| 7,982,747 B1* | 7/2011 | Dulaney et al. | 345/619 |
| 2004/0145602 A1* | 7/2004 | Sun | G06F 17/3028 715/720 |
| 2007/0118508 A1* | 5/2007 | Svendsen | 707/3 |
| 2008/0025649 A1* | 1/2008 | Liu | H04N 1/32128 382/305 |
| 2009/0132933 A1* | 5/2009 | Faski | 715/753 |
| 2009/0265340 A1* | 10/2009 | Barcklay et al. | 707/5 |
| 2009/0287782 A1* | 11/2009 | Odess | 709/206 |
| 2011/0125711 A1* | 5/2011 | Meisenheimer | G06F 17/3028 707/621 |
| 2015/0168162 A1* | 6/2015 | Subramanian | G01C 21/28 701/523 |

\* cited by examiner

*Primary Examiner* — Alex Gofman
(74) *Attorney, Agent, or Firm* — Baker Botts L.L.P.

(57) ABSTRACT

In one embodiment, receiving, from a user of a social network, an image with embedded metadata; and suggesting, to the user, information to be associated with the image based on the embedded metadata.

17 Claims, 1 Drawing Sheet

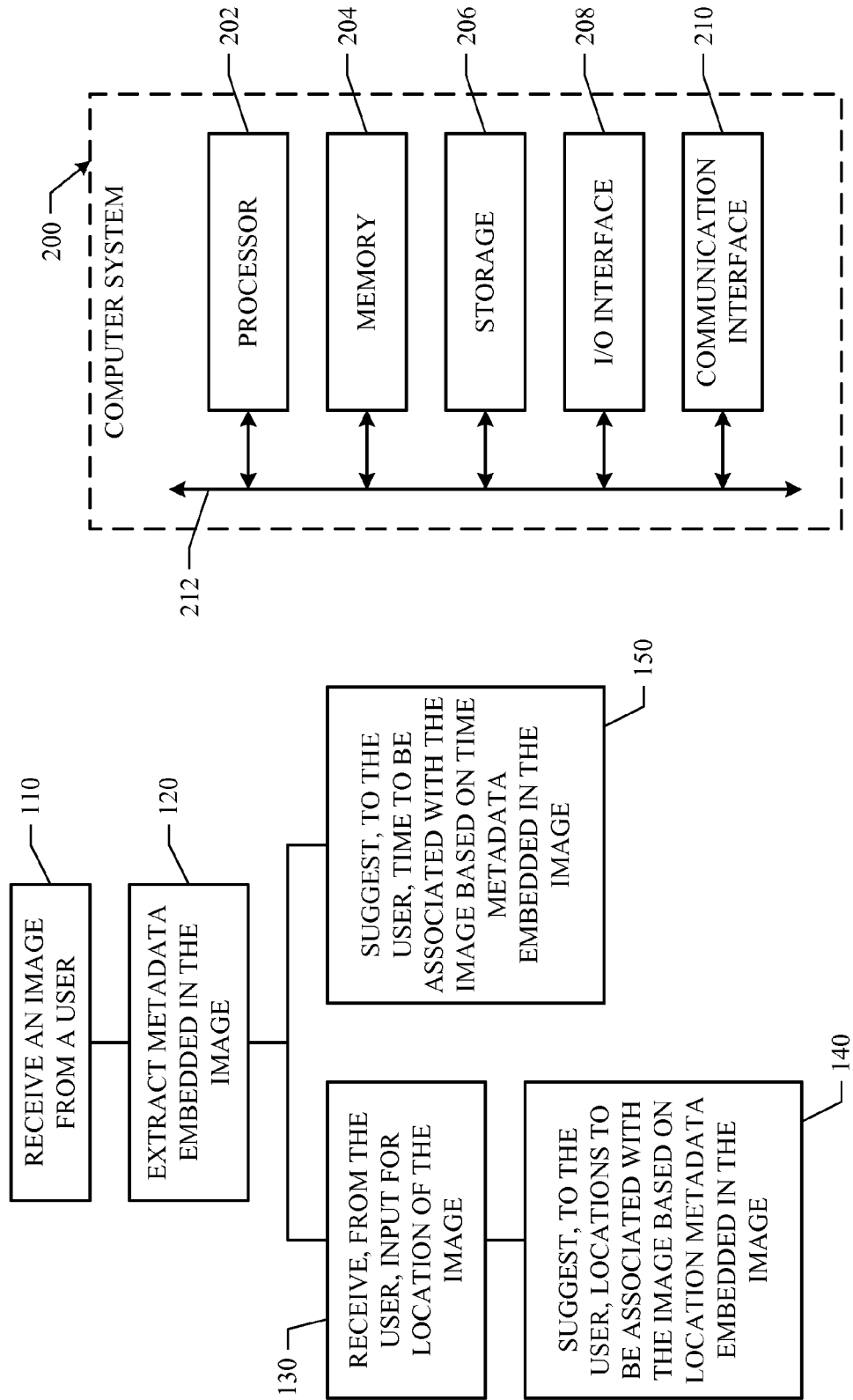

SUGGESTING INFORMATION TO BE ASSOCIATED WITH IMAGES BASED ON METADATA EMBEDDED IN IMAGES

TECHNICAL FIELD

This disclosure generally relates to associating information with images.

BACKGROUND

There are websites that enable their users to upload images, such as digital photographs. These images may be stored on servers or in databases associated with the individual websites, and users may share their uploaded images with other users or with the general public.

BRIEF DESCRIPTION OF THE DRAWINGS

FIG. 1 illustrates an example method for associating information with
images.
FIG. 2 illustrates an example computer system.

DESCRIPTION OF EXAMPLE EMBODIMENTS

When a user uploads an image, such as a digital photograph, to a website, the image may have associated metadata. In some cases, the metadata may be embedded in the image file itself. In particular embodiments, the embedded metadata may include location information associated with the image, such as the latitude and longitude of the place where a digital photograph was taken. In particular embodiments, the embedded metadata may include time information associated with the image, such as a timestamp indicating when a digital photograph was taken (e.g., date and time). The embedded metadata may be extracted from the image and used to suggest, to the user, information to be associated with the image. The information (e.g., location or time) may help describe the image.

FIG. 1 illustrates an example method for associating information with images. The method may start at STEP 110, where a digital image (e.g., a digital photograph) is received from a user. As an example, the user may upload a digital image from a client (e.g., a computer) to a server associated with a website. As another example, the user may take a digital photograph using a smartphone's camera, and subsequently upload the photograph to a server. Note that the user may upload the photograph any time after the photograph was taken.

In particular embodiments, the user is a member of a social network having a social-networking website and has an account with the social-networking website. When the user uploads an image (e.g., to a server associated with the social-networking website), the image may be stored in connection with the user's account. Thereafter, the user may share the image with other members of the social-networking website or with the general public.

In particular embodiments, the image (e.g., a photograph) may have embedded metadata. In some implementations, the photograph may have a format according to Exchangeable Image File Format (EXIF), which is a standard that specifies the formats for images, sound, and ancillary tags used by digital cameras, smartphones, scanners, and other systems handling image and sound files recorded by digital cameras. As an example, the embedded metadata may include location information, such as a latitude and a longitude, indicating where the photograph was taken. As another example, the embedded metadata may include time information, such as a timestamp, indicating when the photograph was taken. At STEP 120, the embedded metadata may be extracted from the image (e.g., according to the specific file format of the image).

In particular embodiments, when a user uploads an image (e.g., a photograph), at the time of uploading or any time thereafter, the user may associate information (e.g., location, time, etc.) with the image, and the information describes the image. As an example, suppose that the user uploads a photograph of the Golden Gate Bridge in San Francisco. The user may associate "Golden Gate Bridge" or "San Francisco" with the photograph as its location information, which indicates where the photograph was taken. Alternatively or in addition, the user may associate May 1, 2012 with the photograph as its time information, which indicates when the photograph was taken.

In particular embodiments, the website may provide a web-based user interface (e.g., web pages) that enables a user to upload images as well as associate descriptive information with individual images. As an example, to specify the location information to be associated with a photograph, the user may type the location of the photograph in an appropriate input field included in a web page. As another example, to specify the time information to be associated with a photograph, the user may select specific time of day, day, month, and year in appropriate input fields included in a web page.

In particular embodiments, the information included in the metadata embedded in the photograph may be used to help the user enter information (e.g., location or time) to be associated with the photograph.

As an example, suppose that the user wishes to provide location information to be associated with the photograph of the Golden Gate Bridge. In the embedded metadata, there may be the latitude and longitude (e.g., approximately 37.82° N by 122.49° W) of the location where the photograph was taken. For example, the EXIF data may include location information such as latitude and longitude coordinates. The latitude and the longitude may be extracted from the embedded metadata.

In particular embodiments, there may be a database that includes sites located at various latitudes and longitudes. Given a specific latitude and longitude, the database may be queried for all the sites within a specified distance from the specific latitude and longitude. For example, given the latitude and longitude (e.g., 37.82° N by 122.49° W) included in the embedded metadata extracted from the photograph, the database may be queried for all the sites located nearby (e.g., within a 200-meter radius of this latitude and longitude).

As the user begins inputting the location information of the photograph at STEP 130, for example, by typing "gol" into the appropriate input field included in a web page, the sites obtained from querying the database, which are near the latitude and longitude extracted from the photograph and whose names begin with "gol", may be suggested to the user at STEP 140, which may include the Golden Gate Bridge. From these suggestions, the user may choose the desired location information to be associated with the photograph (e.g., Golden Gate Bridge).

In particular embodiments, if the sites obtained from querying the database do not include one whose name begins with the letters the user has typed thus far, the database may be queried for sites further away from the latitude and longitude extracted from the photograph. For example, if the user types "em" and there is no site located within a 200-meter radius of the latitude and longitude extracted from the photograph whose name beings with "em", the database may be queried for sites within, for example, a radius of 400 meters, 800 meters, 1600 meters, etc. of the extracted latitude and longitude. The query may gradually expand its radius until at least one site is found whose name begins with the letters the user has typed (e.g., "em"). The matching site or sites may then be suggested to the user.

As another example, suppose that the user wishes to provide time information to be associated with the photograph of the Golden Gate Bridge. In the embedded metadata, there may be a timestamp indicating when the photograph was taken. The timestamp may be extracted from the embedded metadata. For example, with EXIF data embedded in a photograph, the date and time may be recorded in the format "YYYY:MM:DD hh:mm:ss" (e.g., 2011:08:11 16:45:32).

The timestamp may be used to determine the time of day (e.g., hours, minutes, etc), day, month, and year to be associated with the photograph at STEP 150. For example, the time of day, day, month, and year input fields included in a web page may be automatically populated with the specific time of day, day, month, and year corresponding to the timestamp extracted from the photograph. The user may either accept the automatically entered time information or manually modify the time information. The resulting time information is then associated with the photograph.

In particular embodiments, the user may wish to arrange all the photographs the user has uploaded according to a timeline. For example, the photographs may be arranged according to their respective timestamps (e.g., the older photographs are placed before the newer photographs or vice versa). In this case, the photographs may be arranged according to their respective timestamps automatically for the user. Even when the user uploads the photographs randomly (e.g., a newer photograph with a later timestamp is uploaded before an older photograph with an earlier timestamp), the photographs may still be sorted and arranged according to the timestamps indicating when the photographs are actually taken (e.g., as opposed to when they are uploaded to the server). Thus, each photograph may be placed at an appropriate and correct position along the timeline based on its timestamp.

In particular embodiments, the user may be a member of a social network, which has an associated social-networking website. The user may upload photographs to his account at the social-networking website. The photographs uploaded by the user at different times may be arranged along a timeline, such that each photograph is positioned at a correct point along the timeline based on the photograph's timestamp.

In addition to location and time, there are other types of metadata that may be embedded in an image. For example, a digital photograph may have EXIF data such as orientation of the image (e.g., top, left, etc.), compression, X and Y resolutions, X and Y pixel dimensions, camera settings (e.g., aperture, shutter speed, focal length, metering modes, and ISO speed), thumbnail, and so on. Any applicable types of embedded metadata may be extracted from the image and used to help describe or process the image. For example, with the orientation information of the image, the image may be automatically rotated, when appropriate, so that the image is displayed right-side-up. The thumbnail of the image may be used for previewing the image (e.g., when the image is displayed among a group of images). The X and Y pixel dimensions of the image may be used to automatically resize the image or may be included as a part of the description associated with the image so anyone viewing the image may know how big the image is.

Particular embodiments may repeat the steps of the method of FIG. 1, where appropriate. Moreover, although this disclosure describes and illustrates particular steps of the method of FIG. 1 as occurring in a particular order, this disclosure contemplates any suitable steps of the method of FIG. 1 occurring in any suitable order. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Particular embodiments may be implemented on one or more computer systems. FIG. 2 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 200 may include one or more computer systems 200; be unitary or distributed; span multiple locations; span multiple machines; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. The present disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. The present disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include an HDD, a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by one or more computing devices computer server machines associated with a social network, a media item from a client device associated with a user of the social network, wherein the media item comprises embedded metadata comprising a geo-location of where the media item was taken and a timestamp;
   by the computer server machines, extracting the geo-location from the embedded metatdata;
   by the computer server machines, querying a location database to generate a list of a plurality of sites within a predetermined distance from the extracted geo-location;
   by the computer server machines, sending, to the client device, information to display a user interface requesting entry of a descriptive location;
   by the computer server machines, receiving, from the client device, a user input comprising a series of one or more characters, wherein the series of characters represents at least a first portion of a location name;
   by the computer server machines, providing one or more suggested sites to the user based on the list of the plurality of sites within the predetermined distance from the extracted geo-location and the user input;
   by the computer server machines, receiving, from the client device, a user selection of one of the suggested geo-locations;
   by the computer server machines, sending, to the client device, information to display the user interface suggesting a time-information format for the media item based on the timestamp, the time-information format comprising date information including a year, a month, and a day, and time information including an hour unit, a minute unit, and a second unit;
   by the computer server machines, receiving, from the client device, a confirmation of the time-information format or a user-modified version of the time-information format;
   by the computer server machines, storing the media item together with the user-selected geo-location and the time-information format in connection with a social-networking account for the user; and
   by the computer server machines, sending, to other users of the social network, information to display a timeline comprising the media item, the user-selected geo-location, and the time-information format, wherein the media item is incorporated into the timeline in accordance with the embedded metadata,
   wherein the media item is incorporated into the timeline by positioning the media item within the timeline in accordance with the timestamp.

2. The method of claim 1, further comprising:
   iteratively searching, in an area within a search radius of the location of where the media item was taken, for locations having names that begin with the characters inputted by the user and, when no location is found in the area, gradually increasing the search radius until at least one location having a name that includes the characters inputted by the user is found; and selecting one or more of the locations found within one or more of the areas within one or more of the search radii.

3. The method of claim 2, further comprising presenting to the user one or more suggestions of information to be associated with the media item based at least in part on the embedded metadata, wherein the suggestions of information comprise one or more of:

a time of day, a day, a month, or a year corresponding to the time associated with the media item; or one or more of the selected locations.

4. The method of claim 1, wherein the embedded metadata comprises pixel dimensions of the media item, and wherein the media item is incorporated into the timeline by automatically resizing the media item in accordance with the pixel dimensions.

5. The method of claim 1, wherein the embedded metadata comprises a thumbnail of the media item, and wherein the media item is incorporated into the timeline by including a thumbnail of the media item as part of a group of media items in the timeline.

6. The method of claim 1, wherein the embedded metadata comprises an orientation of the media item, and wherein the media item is incorporated into the timeline by automatically rotating the media item in accordance with the orientation.

7. One or more computer-readable non-transitory storage media embodying software that is operable when executed to:

receive, by one or more computer server machines associated with a social network, a media item from a client device associated with a user of the social network, wherein the media item comprises embedded metadata comprising a geo-location of where the media item was taken and a timestamp;

extract, by the computer server machines, the geo-location from the embedded metadata;

query, by the computer server machines, a location database to generate a list of a plurality of sites within a predetermined distance from the extracted geo-location;

send, by the computer server machines, to the client device, information to display a user interface requesting entry of a descriptive location;

receive, by the computer server machines from the client device, a user input comprising a series of one or more characters, wherein the series of characters represents at least a first portion of a location name;

provide, by the computer server machines to the client device, one or more suggested sites to the user based on the list of the plurality of sites within the predetermined distance from the extracted geo-location and the user input;

receive, by the computer server machines from the client device, a user selection of one of the suggested geo-locations;

send, by the computer server machines to the client device, information to display the user interface suggesting a time-information format for the media item based on the timestamp, the time-information format comprising date information including a year, a month, and a day, and time information including an hour unit, a minute unit, and a second unit;

receive, by the computer server machines from the client device, a confirmation of the time-information format or a user-modified version of the time-information format;

store, by the computer server machines, the media item together with the user-selected geo-location and the time-information format in connection with a social-networking account for the user; and send, by the computer server machines to other users of the social network, information to display a timeline comprising the media item, the user-selected geo-location, and the time-information format, wherein the media item is incorporated into the timeline in accordance with the embedded metadata, wherein the media item is incorporated into the timeline by positioning the media item within the timeline in accordance with the timestamp.

8. The computer-readable non-transitory storage media of claim 7, wherein the processors are further operable when executing the instructions to:

iteratively search, in an area within a search radius of the location of where the media item was taken, for locations having names that begin with the characters inputted by the user and, when no location is found in the area, gradually increasing the search radius until at least one location having a name that includes the characters inputted by the user is found; and select one or more of the locations found within one or more of the areas within one or more of the search radii.

9. The computer-readable non-transitory storage media of claim 8, wherein the software is further operable when executing the instructions to present to the user one or more suggestions of information to be associated with the media item based at least in part on the metadata, wherein the suggestions of information comprise one or more of:

one or more of a time of day, a day, a month, or a year corresponding to the time associated with the embedded media item; or one or more of the selected locations.

10. The computer-readable non-transitory storage media of claim 7, wherein the embedded metadata comprises pixel dimensions of the media item, and wherein the media item is incorporated into the timeline by automatically resizing the media item in accordance with the pixel dimensions.

11. The computer-readable non-transitory storage media of claim 7, wherein the embedded metadata comprises a thumbnail of the media item, and wherein the media item is incorporated into the timeline by including a thumbnail of the media item as part of a group of media items in the timeline.

12. The computer-readable non-transitory storage media of claim 7, wherein the embedded metadata comprises an orientation of the media item, and wherein the media item is incorporated into the timeline by automatically rotating the media item in accordance with the orientation.

13. A system comprising:

one or more processors; and a memory coupled to the processors comprising instructions executable by the processors, the processors being operable when executing the instructions to:

receive, by one or more computer server machines associated with a social network, a media item from a client device associated with a user of the social network, wherein the media item comprises embedded metadata comprising a geo-location of where the media item was taken and a timestamp;

extract, by the computer server machines, the geo-location from the embedded metadata;
query, by the computer server machines, a location database to generate a list of a plurality of sites within a predetermined distance from the extracted geo-location;
send, by the computer server machines to the client device, information to display a user interface requesting entry of a descriptive location;
receive, by the computer server machines from the client device, a user input comprising a series of one or more characters, wherein the series of characters represents at least a first portion of a location name;
provide, by the computer server machines to the client device, one or more suggested sites to the user based on the list of the plurality of sites within the predetermined distance from the extracted geo-location and the user input;
receive, by the computer server machines from the client device, a user selection of one of the suggested geo-locations;
send, by the computer server machines to the client device, information to display the user interface suggesting a time-information format for the media item based on the timestamp, the time-information format comprising date information including a year, a month, and a day, and time information including an hour unit, a minute unit, and a second unit;
receive, by the computer server machines from the client device, a confirmation of the time-information format or a user-modified version of the time-information format;
store, by the computer server machines the media item together with the user-selected geo-location and the time-information format in connection with a social-networking account for the user; and
send, by the computer server machines to other users of the social network, information to display a timeline comprising the media item, the user-selected geo-location, and the time-information format, wherein the media item is incorporated into the timeline in accordance with the embedded metadata,
wherein the media item is incorporated into the timeline by positioning the media item within the timeline in accordance with the timestamp.

14. The system of claim 13, wherein the processors are further operable when executing the instructions to:
iteratively search in an area within a search radius of the location of where the media item was taken, for locations having names that begin with the characters inputted by the user and, when no location is found in the area, gradually increasing the search radius until at least one location having a name that includes the characters inputted by the user is found; and
select one or more of the locations found within one or more of the areas within one or more of the search radii.

15. The system of claim 14, wherein the software is further operable when executing the instructions to present to the user one or more suggestions of information to be associated with the media item based at least in part on the metadata, wherein the suggestions of information comprise one or more of:
one or more of a time of day, a day, a month, or a year corresponding to the time associated with the embedded media item; or
one or more of the selected locations.

16. The system of claim 13, wherein the embedded metadata comprises pixel dimensions of the media item, and wherein the media item is incorporated into the timeline by automatically resizing the media item in accordance with the pixel dimensions.

17. The system of claim 13, wherein the embedded metadata comprises a thumbnail of the media item, and wherein the media item is incorporated into the timeline by including a thumbnail of the media item as part of a group of media items in the timeline.

* * * * *